(12) United States Patent
Yanez et al.

(10) Patent No.: US 11,797,320 B2
(45) Date of Patent: Oct. 24, 2023

(54) SYSTEMS AND METHODS TO MANAGE SCREEN SHARING OF DISPLAYED LOCAL SYSTEM WINDOWS

(71) Applicant: DELL PRODUCTS L.P., Round Rock, TX (US)

(72) Inventors: Jonathan Nathan Yanez, Allen, TX (US); Daniel Thomas Daugherty, Plano, TX (US); Ricardo Antonio Ruiz, The Colony, TX (US)

(73) Assignee: Dell Products L.P., Round Rock, TX (US)

( * ) Notice: Subject to any disclaimer, the term of this patent is extended or adjusted under 35 U.S.C. 154(b) by 137 days.

(21) Appl. No.: 17/398,110

(22) Filed: Aug. 10, 2021

(65) Prior Publication Data
US 2023/0051262 A1    Feb. 16, 2023

(51) Int. Cl.
*G06F 9/451* (2018.01)
*H04L 67/10* (2022.01)
*H04L 67/131* (2022.01)

(52) U.S. Cl.
CPC .............. *G06F 9/452* (2018.02); *H04L 67/10* (2013.01); *H04L 67/131* (2022.05)

(58) Field of Classification Search
CPC ........ G06F 9/452; H04L 67/10; H04L 67/131
See application file for complete search history.

(56) References Cited

U.S. PATENT DOCUMENTS

| | | | |
|---|---|---|---|
| 10,628,581 B2 | 4/2020 | Prayaga et al. | |
| 10,664,772 B1 * | 5/2020 | Poel | G06F 3/04842 |
| 10,805,502 B2 | 10/2020 | Reyes et al. | |
| 10,853,506 B2 | 12/2020 | Ruiz et al. | |
| 11,171,959 B2 | 11/2021 | Wu et al. | |
| 2002/0001000 A1 * | 1/2002 | Shpilberg | G06F 3/0481 |
| | | | 715/804 |
| 2004/0075619 A1 * | 4/2004 | Hansen | G06F 9/451 |
| | | | 345/1.1 |
| 2005/0091610 A1 * | 4/2005 | Frei | G06F 3/0481 |
| | | | 715/825 |

(Continued)

OTHER PUBLICATIONS

CVE, "CVE-2021-28133", CVE-ID, Printed from Internet Jul. 14, 2021, 2 pgs.

(Continued)

*Primary Examiner* — Tadesse Hailu
*Assistant Examiner* — Alvaro R Calderon, IV
(74) *Attorney, Agent, or Firm* — Egan, Enders & Huston LLP.

(57) ABSTRACT

Systems and methods are provided that may be implemented to manage screen sharing of local system windows from a local information handling system to other remote information handling systems by a screen sharing application. In one example, the disclosed systems and methods may be implemented to allow selected local system window/s to continue to remain visible to a local user on the local display screen of a local information handling system that is executing a screen sharing application, while at the same time blocking or otherwise preventing the selected local system window/s from being shared by the screen sharing application across a network with other remote information handling systems, e.g., that are participating with the local information handling system in a common web conference session.

30 Claims, 6 Drawing Sheets

(56) References Cited

U.S. PATENT DOCUMENTS

| | | | | |
|---|---|---|---|---|
| 2005/0273466 | A1* | 12/2005 | Yoon | G06F 3/0481 |
| 2006/0168533 | A1* | 7/2006 | Yip | G06Q 10/10 |
| | | | | 715/753 |
| 2006/0208871 | A1* | 9/2006 | Hansen | G06F 3/1454 |
| | | | | 709/219 |
| 2010/0262925 | A1* | 10/2010 | Liu | G06Q 10/10 |
| | | | | 715/759 |
| 2014/0282229 | A1* | 9/2014 | Laukkanen | G06F 9/452 |
| | | | | 715/788 |
| 2015/0058748 | A1* | 2/2015 | Huang | G06F 3/0481 |
| | | | | 715/753 |
| 2015/0149929 | A1* | 5/2015 | Shepherd | H04L 65/403 |
| | | | | 715/753 |
| 2016/0241609 | A1* | 8/2016 | Xin | G06F 3/0484 |
| 2021/0097208 | A1* | 4/2021 | Donahue | G06F 21/84 |
| 2022/0286570 | A1* | 9/2022 | Kashiwagi | H04L 65/403 |
| 2022/0350564 | A1* | 11/2022 | Cao | H04N 21/4788 |
| 2022/0391230 | A1* | 12/2022 | Sharma | G06F 9/48 |
| 2022/0391232 | A1* | 12/2022 | Song | H04L 51/10 |
| 2022/0405710 | A1* | 12/2022 | Iimura | G06F 3/1454 |

OTHER PUBLICATIONS

Wikipedia, "DLL Injection", Printed from Internet Jul. 18, 2021, 6 pgs.
Circle Ninja, "DLL Injection Attacks in a Nutshell", Oct. 16, 2019, 4 pgs.

* cited by examiner

SYSTEMS AND METHODS TO MANAGE SCREEN SHARING OF DISPLAYED LOCAL SYSTEM WINDOWS

FIELD OF THE INVENTION

This application relates to information handling systems and, more particularly, to managing screen sharing of local system windows.

BACKGROUND

As the value and use of information continues to increase, individuals and businesses seek additional ways to process and store information. One option available to human users is information handling systems. An information handling system generally processes, compiles, stores, and/or communicates information or data for business, personal, or other purposes thereby allowing human users to take advantage of the value of the information. Because technology and information handling needs and requirements vary between different human users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific human user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Screen-sharing applications are commonly employed to allow a host computer to share application windows with other participant systems during web conference sessions and, in some situations, multiple screen-sharing applications are required in order to carry out daily activities. However, one problem with conventional screen-sharing applications is the potential for unintended exposure of application windows and/or Operating System (OS) notifications that contain sensitive information, e.g., such as when a user accidentally shares their whole screen or the wrong application window.

Some conventional screen-sharing applications allow a user to limit screen sharing to a specific application window or to "share a single window", but that is an application-specific solution. Moreover, such conventional single-window sharing option does not address the case where a user accidently shares their entire screen or shares the wrong (unintended) application window with other remote users. Nor does conventional single-window sharing address the case where a user that is sharing their entire screen and inadvertently switches to an application window that contains sensitive information, which is then shared with other remote users.

SUMMARY OF THE INVENTION

Disclosed herein are systems and methods that may be implemented to manage screen sharing of local system windows (e.g., such as application windows and/or operating system (OS) notification windows) from a local information handling system to other remote information handling systems by a screen sharing application, e.g., during a web conference session. The disclosed systems and methods may be implemented in one embodiment to allow selected local system window/s to continue to remain visible to a local user on the local display screen of a local information handling system that is executing a screen sharing application, while at the same time blocking or otherwise preventing the selected local system window/s from being shared by the screen sharing application across a network with other (e.g., remote) information handling systems, e.g., that are participating with the local information handling system in a common web conference session. The selected local system window/s may be chosen by a local user to be non-shareable, and/or may be predefined as non-shareable, in order to prevent the selected local system window/s from being visible to remote users on the remote display screens of their remote systems. In one embodiment, all operating system notification windows may be designated (e.g., by a user and/or predefined) to be non-shareable to prevent them from being visible to remote users on remote display screens of their remote systems.

In one embodiment, a local user may select one or more local system window/s that are visible on a local information handling system display screen that the local user does not want shared across a network and made visible to other remote users on remote display screens of other remote information handling systems, while at the same time maintaining visibility of these selected local system window/s on the local display screen of the local information handling system. In this way, the local user is protected or prevented from accidentally sharing all content of their local display screen and/or accidentally sharing the wrong local system window across a network to other remote users (e.g., other web conference participants), while at the same time these selected local system windows will maintain continuously visible to the local user on the local information handling system display screen, thus allowing the local user to continue their normal work without interruption and with the assurance of continued protection and privacy.

In one embodiment, the disclosed systems and methods may be implemented in a manner that is application-independent, i.e., that works to manage screen sharing of local system window/s from a local information handling system regardless of what screen-sharing application is currently being used. For example, protection from screen sharing of selected local system window/s may be achieved by preventing the operating system (OS) of a local information handling system from allowing window-capturing application programming interfaces (APIs) used by screen sharing applications from sharing the selected local system window/s to ensure that selected local system window/s generated on the local information handling system display screen will remain non-visible across a network to remote user/s no matter what screen-sharing application is concurrently executing on the local information handling system.

In one embodiment, the disclosed systems and methods may be advantageously implemented to manage what windows are non-sharable by a local information handling system before the local information handling system shares any content of its local display screen, and then persisting those settings as the local information handling system moves between different meetings (or web conferences) and/or between different screen sharing applications, while at the same time not interfering with a local user's normal work on the local information handling system. In this way, a local user may have confidence that they will not accidently share a local system window (e.g., executing application window or operating system notification window) that exposes information they did not intend to share with remote users of other remote information handling systems.

The disclosed systems and methods may therefore be implemented with multiple different screen sharing applications such as Zoom, Teams, or any other software or other logic that supports screen-sharing from a local information handling system with one or more remote information handling systems, and in a manner that protects a local user's sensitive data (e.g., Microsoft Outlook open emails, messaging application chat information or "pop-up" message or comment windows, etc.) from inadvertent sharing from the local information handling system to the remote information handling systems. In this way, the screen sharing process may be made easier for local users who are working remotely, while at the same time maintaining their personal privacy by ensuring that their sensitive data is kept private. This gives the local user the peace of mind to share their local screen without exposing information they did not intend to share.

In one respect, disclosed herein is a method, including: displaying a local screen on a local display device of a local information handling system, the displayed local screen including visual images of one or more windows that are displayed on the local display device; determining whether each of the one or more windows of the displayed local screen is designated as a non-shareable window; and then sharing the local screen from the local information handling system with at least one remote information handling system by transmitting visual image data corresponding to visual images of at least a portion of the local screen across a network to the at least one remote information handling system without including any visual image data corresponding to visual images of any of the one or more windows that are determined to be designated as a non-shareable window.

In another respect, disclosed herein is a system, including: a local information handling system including at least one programmable integrated circuit, and a local display device coupled to the at least one programmable integrated circuit. The at least one programmable integrated circuit of the local information handling system may be programmed to: display a local screen on the local display device of the local information handling system, the displayed local screen including visual images of one or more windows that are displayed on the local display device; determine whether each of the one or more windows of the displayed local screen is designated as a non-shareable window; and then share the local screen from the local information handling system with at least one remote information handling system by transmitting visual image data corresponding to visual images of at least a portion of the local screen across a network to the at least one remote information handling system without including any visual image data corresponding to visual images of any of the one or more windows that are determined to be designated as a non-shareable window.

DESCRIPTION OF ILLUSTRATIVE EMBODIMENTS

Figure 1:
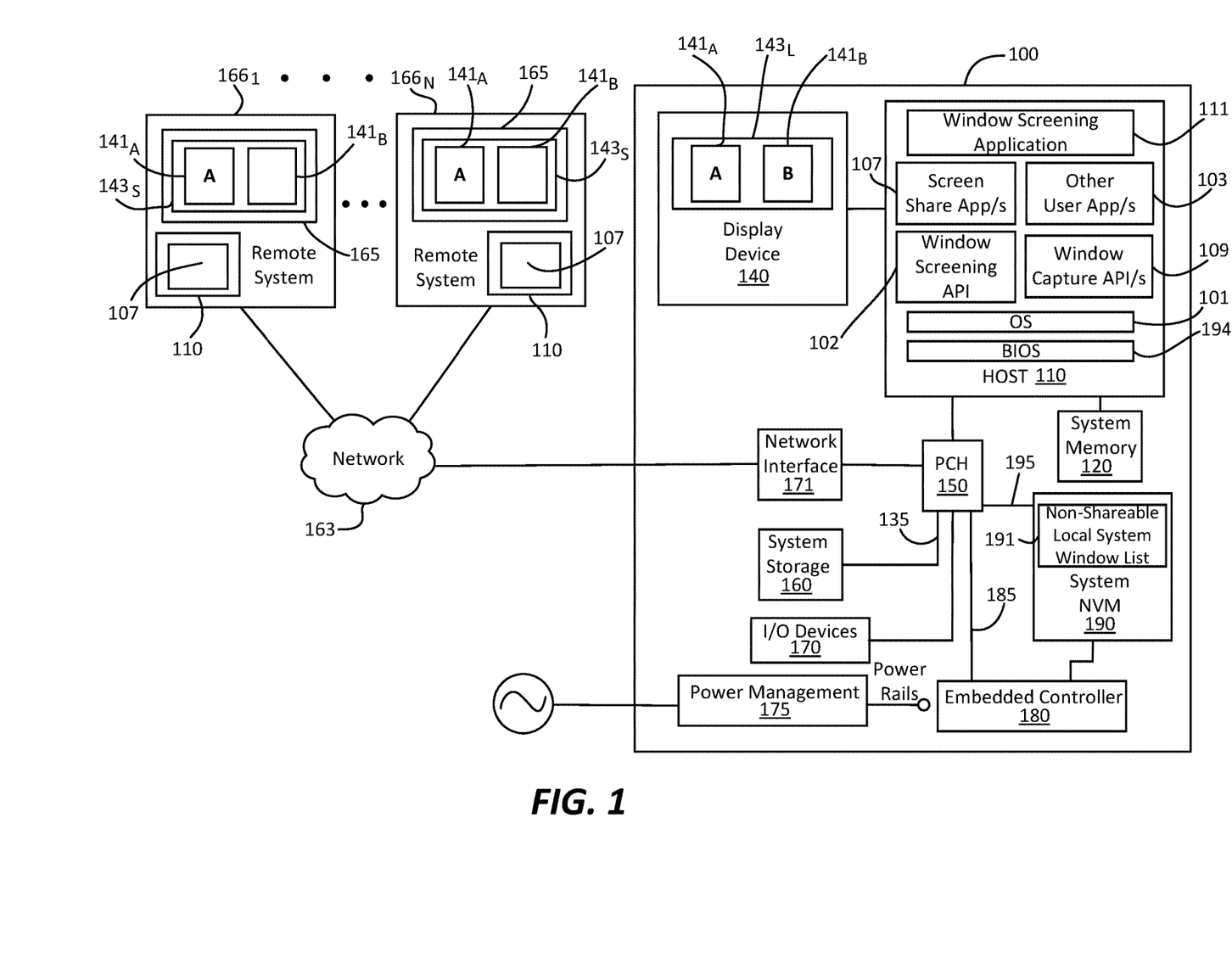
FIG. 1 illustrates a block diagram of an information handling system according to one exemplary embodiment of the disclosed systems and methods.

FIG. 1 is a block diagram of a local information handling system 100 (e.g., an information handling system such as a desktop computer, laptop computer, tablet computer, MP3 player, personal data assistant (PDA), cell phone, etc.) as it may be configured according to one embodiment of the disclosed systems and methods. In this regard, it should be understood that the configuration of FIG. 1 is exemplary only, and that the disclosed methods may be implemented on other types of information handling systems. It should be further understood that while certain components of a local information handling system are shown in FIG. 1 for illustrating embodiments of the disclosed systems and methods, the local information handling system is not restricted to including only those components shown in FIG. 1 and described below.

As shown in FIG. 1, local information handling system 100 may include a host programmable integrated circuit 110 which may include any type of processing device, such as an Intel central processing unit (CPU), an Advanced Micro Devices (AMD) CPU or another programmable integrated circuit. Host programmable integrated circuit 110 is coupled as shown to system memory 120, which may include, for example, random access memory (RAM), dynamic RAM (DRAM), synchronous DRAM (SDRAM), etc. In the embodiment of FIG. 1, host programmable integrated circuit 110 may be configured to access system non-volatile memory 190 (e.g., serial peripheral interface (SPI) Flash memory) to load and boot part of a system BIOS 194 and write and/or read other stored information such as identity of designated non-shareable local system windows of a non-shareable local system window list 191 that is described further herein.

In FIG. 1, host programmable integrated circuit is executing an operating system (OS) 101 (e.g., proprietary OS such as Microsoft Windows 10, open source OS such as Linux OS, etc.) and BIOS 194 for system 100, as well as user software applications 103 (e.g., word processing application, email application, messaging application, Internet browser, computer game, PDF viewer, spreadsheet application, etc.), etc. Additional logic components executing on host programmable integrated circuit in FIG. 1 include one or more screen share applications (e.g., such as Zoom, Teams, etc.) 107 that support screen sharing capability, one or more window capture APIs 109 used by screen share applications 107, window screening application 111, and window screening API 102 that is used by window screening application 111. In some embodiments, window screening application 111 and window screening API 102 may be packaged together with other user application software and/or firmware, e.g., such as a display manager application.

In the embodiment of FIG. 1, host programmable integrated circuit 110 may be coupled to an external or internal (integrated) display device 140 (e.g., LCD or LED display device or other suitable display device) of system 100. In such an embodiment, integrated graphics capability may be implemented by host programmable integrated circuit 110 to provide visual images (e.g., a graphical user interface, static images and/or dynamic content such as video images) to display device 140 for display to a system user. It will be understood that in other embodiments a separate programmable integrated circuit (e.g., such as graphics processor unit "GPU") may be coupled between host programmable integrated circuit 110 and display device 140 to provide graphics capability for local information handling system 100.

In FIG. 1, visual images provided by host programmable integrated circuit 110 to display device 140 include an active local desktop screen $143_L$ that includes separate multiple different side-by-side windows 141A and 141B such as may be simultaneously generated for display by the same (or different) user applications 103 that are concurrently executing together on host programmable integrated circuit 110, or as may be simultaneously generated for display by a given executing user application 103 and a given operating system notification from OS 101. In FIG. 1, window 141A contains a displayed first visual image "A" (representing one or more of text, video or still photo images, etc.), while window 141B contains a displayed second visual image "B" (representing one or more of text, video or still photo images, etc.) that is different than visual image "A" of window 141A. As further described in relation to FIGS. 2A-2B, and in FIGS. 3A and 3B, the visual image content of window 141B is designated as non-shareable in non-shareable local system window list 191, while the visual image content of window 141A is not designated as non-shareable in non-shareable local system window list 191.

In the embodiment of FIG. 1, platform controller hub (PCH) 150 controls certain data paths and manages information flow between components of the local information handling system 100. As such, PCH 150 may include one or more integrated controllers or interfaces for controlling data paths connecting PCH 150 with host programmable integrated circuit 110, system storage 160, input/output (I/O) devices 170, network interface (I/F) device 171, out-of-band programmable integrated circuit in the form of an embedded controller 180, and system NVM 190 where non-shareable local system window list 191 may be stored together with other logic components such as BIOS firmware image and settings, ACPI firmware, etc. In one embodiment, PCH 150 may include a Serial Peripheral Interface (SPI) controller and an Enhanced Serial Peripheral Interface (eSPI) controller. In some embodiments, PCH 150 may include one or more additional integrated controllers or interfaces such as, but not limited to, a Peripheral Controller Interconnect (PCI) controller, a PCI-Express (PCIe) controller, a low pin count (LPC) controller, a Small Computer Serial Interface (SCSI), an Industry Standard Architecture (ISA) interface, an Inter-Integrated Circuit ($I^2C$) interface, a Universal Serial Bus (USB) interface and a Thunderbolt™ interface.

As shown in FIG. 1, external and/or internal (integrated) I/O devices 170 (e.g., a keyboard, mouse, touchpad, touchscreen, etc.) may be coupled to PCH 150 of system 100 to enable a local human user to input data to, and otherwise interact with, local information handling system 100, and to interact with application programs or other software/firmware executing on host programmable integrated circuit 110. The network I/F device 171 enables wired and/or wireless communication with other remote information handling systems 166 via an external network 163 (e.g., the Internet), and in one embodiment may be a network interface controller (NIC) which may communicate with external network 163 across an intervening local area network (LAN), wireless LAN (WLAN), cellular network, etc. It will be understood that each of remote information handling systems 166 may be configured in one embodiment with one or more similar components and similar system architecture as local information handling system 100.

In FIG. 1, local system storage 160 may include one or more media drives, such as hard disk drives (HDDs), optical drives, NVRAM, Flash memory, solid state drives (SSDs), or any other suitable form of internal or external storage that is coupled via data bus (e.g., PCIe bus. SATA bus, etc.) 135 through PCH 150 to provide non-volatile storage media for local information handling system 100. A power source for local information handling system 100 may be provided via an external power source (e.g., mains power) and an internal power supply regulator, and/or by an internal power source, such as a battery. As shown in FIG. 1, power management system 175 may be included within local information handling system 100 for moderating the available power from the power source. In one embodiment, power management system 175 may be coupled to provide operating voltages on one or more power rails to various power-consuming components of local information handling system 100, as well as to perform other power-related administrative tasks of the local information handling system.

As shown in FIG. 1, out-of-band programmable integrated circuit 180 may be an embedded controller (EC) that is coupled to PCH 150 and which may be programmed to perform tasks of storage failure logic 183 as described elsewhere herein, and to execute other logic such as power/thermal system management, etc. Out-of-band programmable integrated circuit 180 may also be programmed to execute program instructions to boot information handling system 100, load application firmware from NVM 190 into internal memory, launch the application firmware, etc. Out-of-band programmable integrated circuit 180 may be, for example, a controller, microcontroller, microprocessor, ASIC, etc., or as a programmable logic device "PLD" such as FPGA, complex programmable logic device "CPLD", etc. Besides an embedded controller, other examples of out-band-programmable integrated circuits include, but are not limited to, baseboard management controller "BMC", service processor, embedded processor, remote access controller, etc. In this regard, an out-of-band programmable integrated circuit 180 is separate and independent from in-band host programmable integrated circuit 110 that runs the host OS 101 of the information handling system 100, and that executes without management of any application executing with the host OS 101 on the host programmable integrated circuit 110.

As shown in the exemplary embodiment of FIG. 1, EC 180 is coupled to PCH 150 via data bus 185, and NVM 190 is coupled to PCH 150 via data bus 195. According to one embodiment, data bus 195 is a Serial Peripheral Interface (SPI) bus, and data bus 185 is an Enhanced Serial Peripheral Interface (eSPI) bus. In the embodiment shown in FIG. 1, NVM 190 may be a SPI Flash memory device that is a shared Flash memory device, which is connected to PCH 150 and EC 180. In such a configuration, PCH 150 provides EC 180 shared access to NVM 190 via eSPI bus 185, SPI bus 195, and various interface and logic blocks included within the PCH 150.

Also shown in FIG. 1 are remote information handling systems 166 which each include an integrated or external remote system display 165 that displays visual images to a given remote user. A version of screen-sharing application 107 is executing on a host programmable integrated circuit 110 of each of remote information handling systems 166 in FIG. 1 that is the same as the screen-sharing application 107 that is currently executing on host programmable integrated circuit 110 of local information handling system 100. In the embodiment of FIG. 1, screen-sharing application 107 on each remote system display 165 is shown displaying a shared desktop screen $143_S$ that corresponds to the local desktop screen $143_L$ which is currently shared by the local user of local information handling system 100.

Figure 2A:
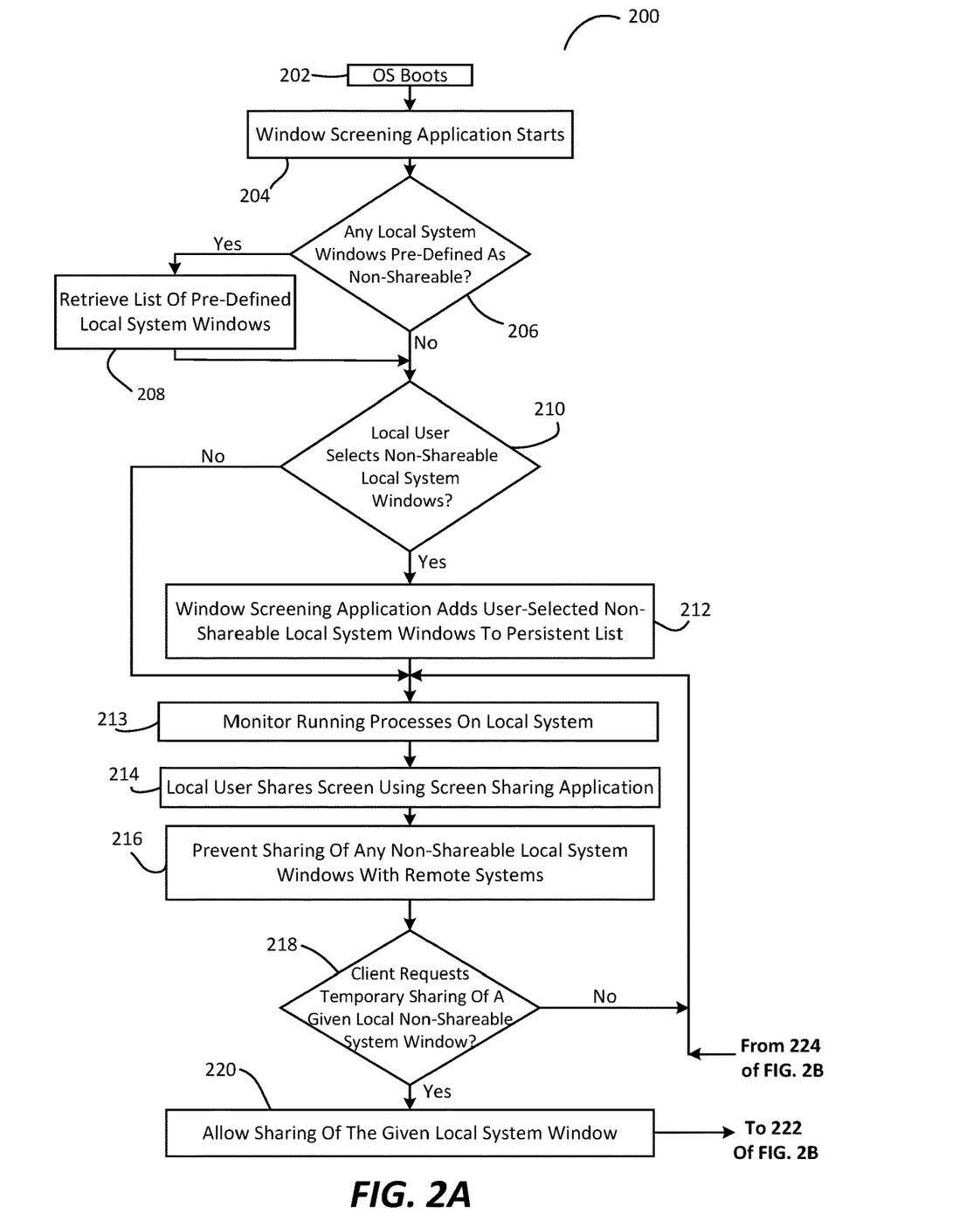
FIG. 2A illustrates methodology according to one exemplary embodiment of the disclosed systems and methods.
Figure 2B:
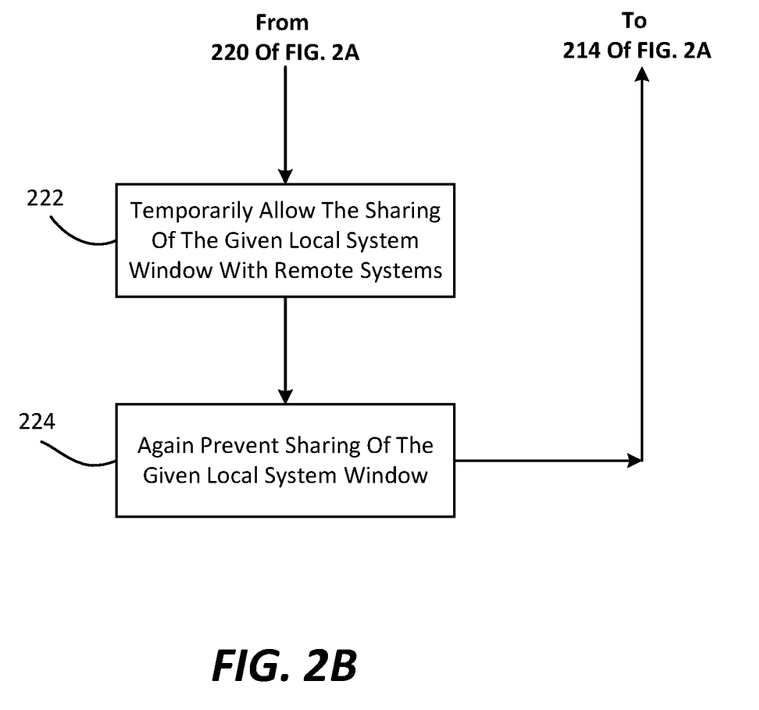
FIG. 2B illustrates methodology according to one exemplary embodiment of the disclosed systems and methods.
Figure 3A:
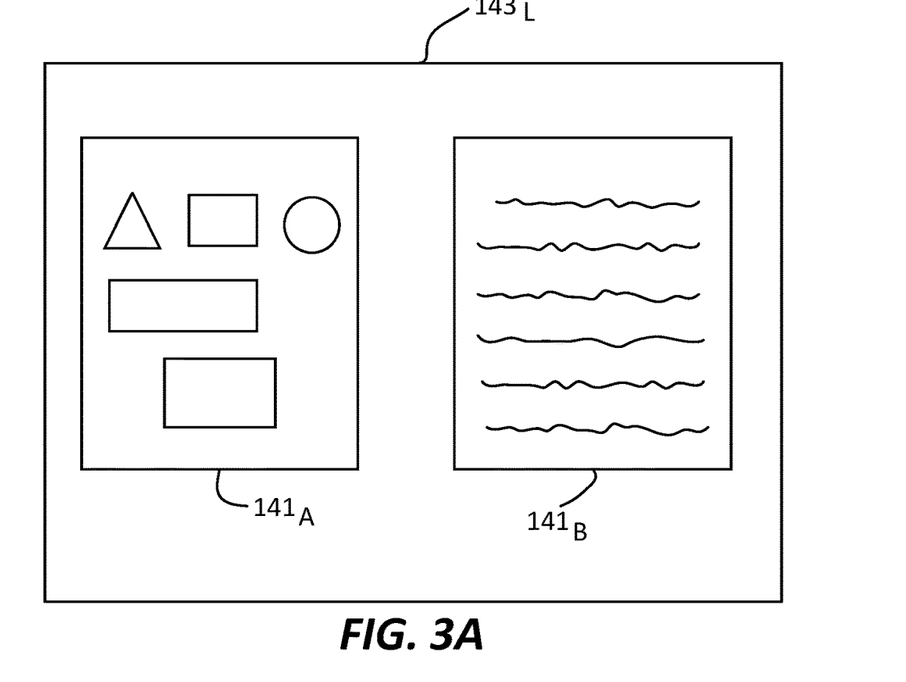
FIG. 3A illustrates a displayed local screen of a local information handling system according to one exemplary embodiment of the disclosed systems and methods.
Figure 3B:
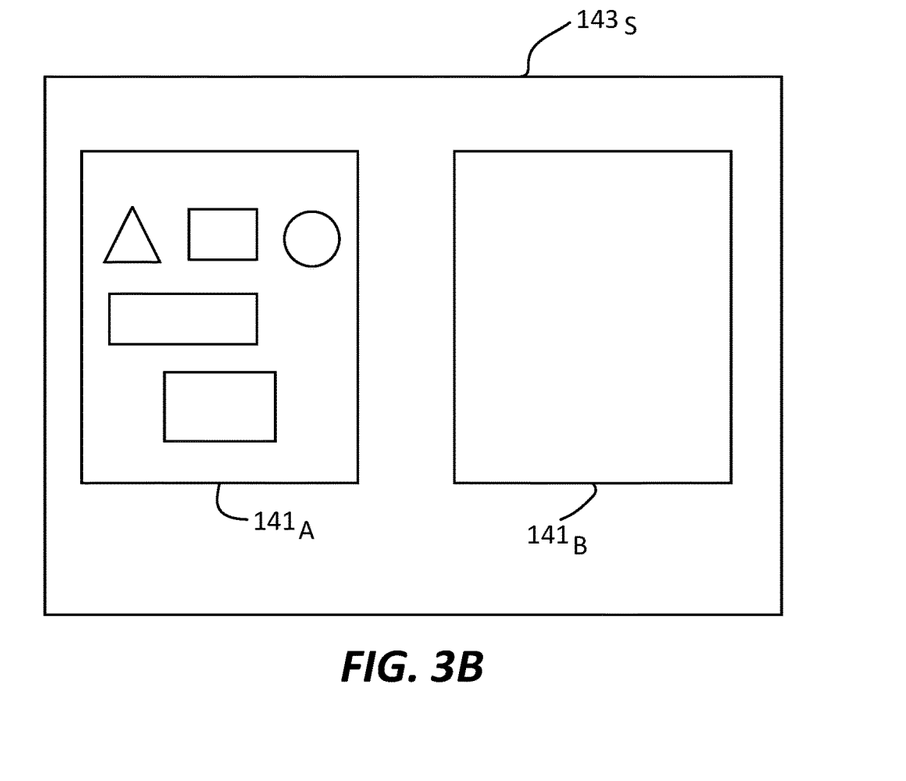
FIG. 3B illustrates a displayed shared screen of a remote information handling system according to one exemplary embodiment of the disclosed systems and methods.
Figure 3C:
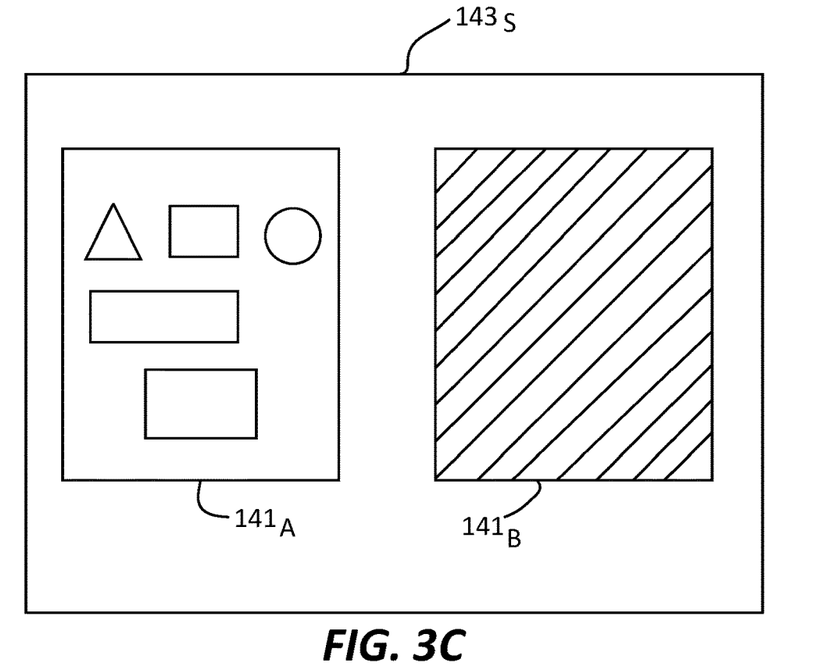
FIG. 3C illustrates a displayed shared screen of a remote information handling system according to one exemplary embodiment of the disclosed systems and methods.

As further described herein in relation to FIGS. 2A-2B, and in FIGS. 3A, 3B, 3C and 3D, window 141A of shared desktop screen $143_S$ on each remote system display 165 displays the same displayed first visual image "A" that is displayed in shareable window 141A (i.e., that has not been designated as a non-shareable window) of local desktop screen $143_L$, while non-shareable window 141B of shared desktop screen $143_S$ does not display the second visual image "B" that is displayed in window 141B of local desktop screen $143_L$. For example, in one embodiment non-shareable window 141B of shared desktop screen $143_S$ may instead be displayed as a blank opaque window (FIG. 3B) that may be black or other opaque color, or may be displayed as a pattern such as cross-hatching (FIG. 3C). In another example embodiment shown in FIG. 3D, non-shareable window 141B may not be displayed at all on shared desktop screen $143_S$, i.e., non-shareable window 141B may not be visible on shared desktop screen $143_S$.

FIGS. 2A-2B illustrate one exemplary embodiment of methodology 200 that may be implemented to manage screen sharing of local system windows 141A and 141B from local information handling system 100 to other remote information handling systems by a screen sharing application 107. It will be understood that the particular combination of blocks of methodology 200 is exemplary only, and that other combinations and/or order of additional, fewer, and/or alternative blocks may be employed that are suitable for managing screen sharing of local system windows from a local information handling system.

As shown in the embodiment of FIGS. 2A-2B, methodology 200 begins in block 202 when OS 101 is booted on host programmable integrated circuit 110 of local system information handling system 200, e.g., after system power on or system restart. After OS 101 is booted, window screening application 111 starts on host programmable integrated circuit 110 in block 204. After starting in block 204, window screening application 111 accesses non-shareable local system window list 191 on NVM 190 in block 206 to determine if the identity of any local system windows have been predefined (or should be designated) as non-shareable in non-shareable local system window list 191. It will be understood that a non-shareable local system window list 191 may be alternatively stored in other non-volatile persistent memory or storage of system 100 (e.g., such as system storage 160) and/or stored in locations such as the system registry, configuration files, etc.

The identity of non-shareable local system windows (e.g., including any local system windows generated by particular predefined applications) may be predefined in any suitable manner within non-shareable local system window list 191 on NVM 190. As described in further detail below, all local system windows may be predefined in one exemplary embodiment as non-shareable, e.g., such as all word processing application windows, all spreadsheet application windows, all Internet browser application windows, all email application windows, all PDF viewer application windows, all messaging application windows, all computer game windows, all OS notification windows, etc. In another exemplary embodiment, only particular local system windows may be predefined as non-shareable, e.g., such as the window of a particular word processing application document, the window of a particular spreadsheet application document, the window of a particular Internet browser web page, the window of a particular email application document, the window of a particular PDF viewer application document, the window of a particular messaging application thread, the window of a particular computer game session, the window of a particular OS notification, etc. In another exemplary embodiment, all windows containing a particular designated text (e.g., such as the word "confidential" or the word "draft") may be predefined or user-designated as non-shareable in block 206, in which case window screening application 111 may search or scan each local system window in real time as it is opened on the system 100, and then designate any local system window as non-shareable that contains the particular designated text. Further detail on some example exemplary embodiments for predefining local system windows as non-shareable follows below.

In one exemplary embodiment, any local system window having a given name may be designated as non-shareable local system window, e.g., such as any local system window name that includes the term "Inbox" may be designated as non-shareable. In such an example, window screening application 111 may search local system window names for the text "Inbox" (e.g., such as "Inbox—John Q. Smith") and prevent sharing by window sharing application/s 107 of any local system window having that text (e.g., "Inbox") in the local system window name.

In another exemplary embodiment, all local system windows generated by running a predefined application executable path may be designated as non-shareable. For example, an executable path such as "C:\program files\Dell\SomeApplication.exe" may be so predefined, and then window screening application 111 may prevent sharing by window sharing application/s 107 of any local system window/s generated from running an executable within this predefined "Dell" folder name (or alternatively generated by running an executable having this particular pre-defined "SomeApplication.exe" executable name within the "Dell" folder).

In another exemplary embodiment, all local system windows generated by running predefined application command line parameters (e.g., "{executable path} {file to open}") may be designated as non-sharable. For example, application command line parameters "C:\program files\Microsoft\WinWord.exe PromotionCandidate List.docx" may be so predefined, and then window screening application 111 may prevent sharing of any local system window/s generated from starting an application using "C:\program files\Wicrosoft\WinWord.exe PromotionCandidateList.docx" so that the local system window of the particular word processing application document generated from "PromotionCandidateList.docx" is prevented from being shared by window sharing application/s 107.

In another exemplary embodiment, all local system windows generated by an application having a predefined application file handle may be designated as non-sharable. For example, an application file handle "C:\users\JohnQSmith\Documents\PromotionCandidate List.docx" may be so predefined, and then window screening application 111 may prevent sharing by window sharing application/s 107 of any local system window/s generated from an application having a file open "C:\users\JohnQSmith\Documents\PromotionCandidate List.docx".

In another exemplary embodiment, window screening application 111 may be configured to prevent sharing by window sharing application/s 107 of any local system windows generated by a given application having a predefined given name (e.g., all windows generated by the entire given application are designated non-shareable). In another exemplary embodiment, window screening application 111 may be configured to prevent sharing by window sharing application/s 107 of any local system windows having predefined keywords (text) found in the window title bar (e.g., such as "confidential", "sensitive", etc., certain websites, etc.). In another exemplary embodiment, window screening application 111 may be configured to prevent sharing by window sharing application/s 107 of any local system browser application windows generated by particular predefined website/s. In another exemplary embodiment, window screening application 111 may be configured to prevent sharing by window sharing application/s 107 of any local system windows generated by a given application having a predefined given name (e.g., all windows generated by the entire given application are designated non-shareable). In another exemplary embodiment, In another exemplary embodiment, window screening application 111 may be configured to prevent sharing by window sharing application/s 107 of any local system windows identified as non-shareable within non-shareable local system window list 191 by a local selection made by the local system user, e.g., using any of the criteria for predefining a local system window as non-shareable that are described elsewhere herein.

Still referring to methodology 200 of FIGS. 2A-2B, if any local system window/s are found to have been predefined as non-shareable in block 206, then methodology 200 proceeds to block 208 where window screening application 111 retrieves the identity of the predefined non-sharable local system window/s and sets the pre-defined non-shareable local system window/s as non-shareable windows during the current OS session.

In block 210 of methodology 200, window screening application 111 may offer a local system user of system 100 the opportunity to customize what local system windows are designated to be non-shareable in persistent non-shareable local system window list 191 on NVM 190, e.g., by user input through I/O devices 170 to a graphical user interface (GUI) displayed by window screening application 111 on display device 140). If no local system windows are designated by the local system user in block 210, then methodology 200 proceeds to block 214 which is described further below.

However, if one or more local system window/s are designated to be non-shareable by the local system user in block 210, then methodology 200 proceeds to block 212 where window screening application 111 adds the user-selected local system window/s of block 210 to the persistent non-shareable local system window list 191 on NVM 190, and sets the user-selected non-shareable local system window/s of block 210 as non-shareable windows during the current OS session. As described further herein, once one or more local system windows are set to be non-shareable (including both pre-defined and user-selected non-shareable local system windows), they are no longer shareable via any screen sharing application 107 executing on host programmable integrated circuit 110.

Next, in block 213, window screening application 111 monitors the currently-executing executing process/es (e.g., application/s) on host programmable integrated circuit 110 as they start and then determines whether any windows generated by each currently-executing process is designated as non-shareable on persistent non-shareable local system window list 191 (e.g., this may be done as each process is initiated) and therefore needs to be set as non-shareable in the manner described further below. If the local system is booting, then window screening application 111 may iterate over all the currently-executing processes to determine if any of their respective windows is designated as non-shareable and then process them at that time versus persistent non-shareable local system window list 191 to identify any of their respective designated non-shareable windows that need to be set as non-shareable. After this time, persistent non-shareable local system window list 191 may continue to monitor newly-initiated processes as shown and handle them in the same manner as they are started identify any of their designated windows that need to be set as non-shareable, even after a user has previously entered a command (e.g., via I/O devices 170) that requests host programmable integrated circuit 110 to share the current local screen $143_L$ with remote users of one or more remote systems $166_1$ to $166_N$ using an instance of screen share application 107. Once identified and set as non-shareable, each designated non-shareable window remains non-shareable (subject to steps 218 to 222 described below) any time the local screen is shared as described further below.

In one embodiment, window screening application 111 may utilize window screening API 102 to interface with and instruct OS 101 to set the user-selected non-shareable local system window/s of block 210 as non-shareable, e.g., to instruct OS 101 that each of the user-selected non-shareable local system window/s of block 210 are not to be shared with window capture APIs 109 that are utilized by screen sharing application/s 107. In one embodiment, an injection process may be used to inject information into a given application 103 and/or into a data stream associated with displaying one or more given non-shareable local system window/s generated by the given application 103 that identifies each of these given non-shareable local system window/s as being non-shareable. For example, dynamic link library (DLL) injection and/or API "hooking" may be used to interface with a given application 103 and to inject information or data into a given application 103 (and/or into data used by the given application 103) that identifies one or more particular local system windows generated by the given application 103 as non-shareable. In such an example implementation, window screening API 102 may be called to enforce non-sharing of the identified local system window/s by screen sharing application/s 107. Further information that may be employed to implement such an injection process may be found described, for example, in U.S. Pat. Nos. 10,628,581; 10,805,502; and 10,853,506; each of the foregoing being incorporated herein by reference in its entirety for all purposes.

Next, block 214 of methodology 200 occurs anytime a screen sharing application 107 is currently executing on host programmable integrated circuit 110 of local system 100. Also concurrently executing in block 214 on host programmable integrated circuit 110 are one or more user applications 103 (or a user application 103 and an operating system notification from OS 101) that in this embodiment generate and simultaneously display at least two different side-by-side local system windows 141A and 141B on active local screen 143$_L$ of display device 140 of local information handling system 100 as shown in FIG. 1 and further illustrated in FIG. 3A.

As shown in FIG. 3A, window 141A of local screen 143$_L$ contains a shareable displayed first visual image "A" represented in FIG. 3A as multiple geometric shapes (but which may be in various embodiments one or more of text, video or still photo images, etc.), while window 141B of local screen 143$_L$ contains a non-shareable displayed second visual image "B" represented in FIG. 3A as multiple lines of text (but which may be in various embodiments one or more of text, video or still photo images, etc.) that is different than first visual image "A" of window 141A. In this regard, the visual image content "B" of window 141B is designated as non-shareable in non-shareable local system window list 191, while the visual image content "A" of window 141A is not designated as non-shareable in non-shareable local system window list 191, and is therefore shareable. However, both the first visual image "A" of window 141A and the second visual image "B" of window 141B are displayed and visible to the local user of system 100 in the active local screen 143$_L$ of display device 140 to the local user of system 100.

In block 214 of methodology 200, a local system user of system 100 enters (or has previously-entered) a command (e.g., via I/O devices 170) that requests host programmable integrated circuit 110 to share the current local screen 143$_L$ with remote users of one or more remote systems 166$_1$ to 166$_N$ using an instance of screen share application 107. The screen share application 107 on system 100 in turn calls on window capture API/s 109 to instruct OS 101 to share the current local screen 143$_L$ through screen share application 107 executing on system 100 with other instances of screen share application 107 that are executing on remote systems 166$_1$ to 166$_N$.

Next, in block 216, OS 101 responds to the screen sharing request of block 214 from screen share application 107 by only sharing visual image data corresponding to visual images of shareable local system windows of local screen 143$_L$ that are not designated as non-shareable local system windows (together with any other shareable visual images of local screen 143$_L$ that are not designated as non-shareable such as desktop wallpaper, etc.) across network 163 with remote system/s 166$_1$ to 166$_N$. Specifically, OS 101 prevents sharing of any visual image data across network 163 with remote system/s 166$_1$ to 166$_N$ that corresponds to visual images of a displayed local system window of currently active local screen 143$_L$ that has been set as non-shareable in block 212 by window screening application 111 (via instruction to OS 101 by window screening API 102).

Figure 3D:
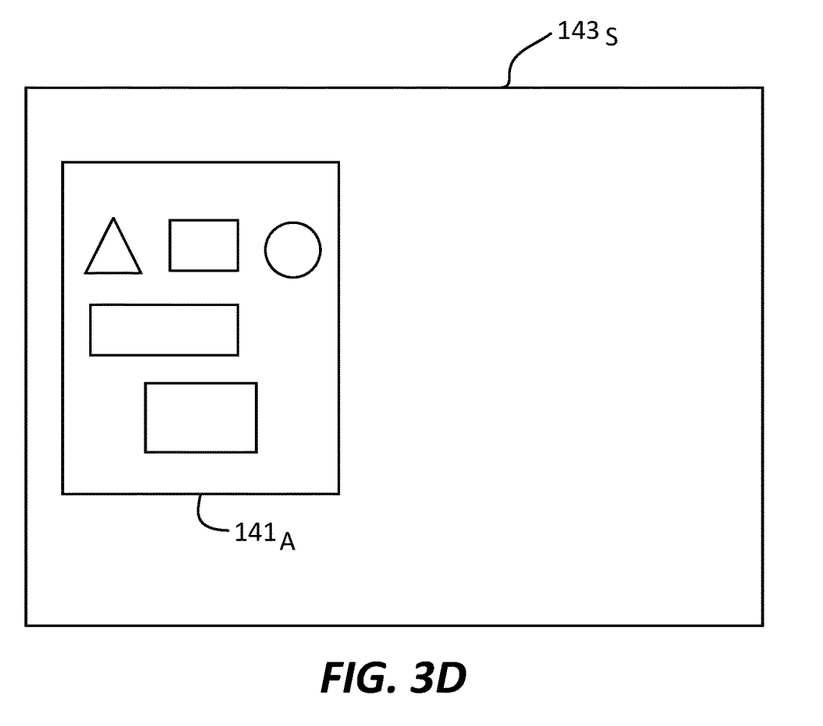
FIG. 3D illustrates a displayed shared screen of a remote information handling system according to one exemplary embodiment of the disclosed systems and methods.
Figure 3E:
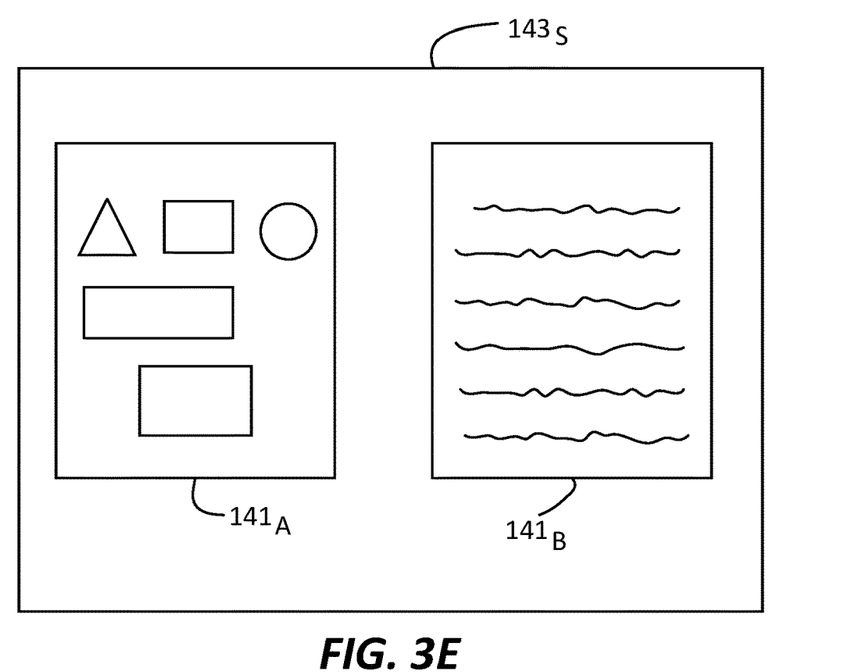
FIG. 3E illustrates a displayed shared screen of a remote information handling system according to one exemplary embodiment of the disclosed systems and methods.

FIGS. 3B, 3C and 3D show different example embodiments of shared desktop screen 143$_S$ that is visible on remote display device/s 165 of remote information handling system/s 166$_1$ to 166$_N$ as it may be displayed on remote display device/s 165 concurrently with display of local desktop screen 143$_L$ of FIG. 3A on local display device 140 of local information handling system 100. As shown in each of FIGS. 3B, 3C and 3D, visual image data of non-shareable second visual image "B" of window 141B is not transmitted and shared across network 163 with respective remote system display/s 165 so that the second visual image "B" is therefore not displayed and is not visible to remote user/s on respective remote system display/s 165.

In the embodiment of FIG. 3B, window 141B may be displayed on remote display device/s 165 as a blank opaque area of a selected color with no portion of the second virtual image "B" being visible. In the embodiment of FIG. 3C, window 141B may be displayed on remote display device/s 165 as a pattern (e.g., cross-hatched or any other selected pattern) with no portion of the second virtual image "B" being visible. In the embodiment of FIG. 3D, the entire window 141B may be not be displayed at all (and therefore may be invisible) on remote display device/s 165 and such that no portion of the second virtual image "B" is visible. It will be understood that FIGS. 3B, 3C and 3D are exemplary only, and that a non-shareable window 141B may be displayed (or not displayed) on remote display device/s 165 in any other manner such that no portion of the second virtual image "B" is visible on the remote display device/s 165.

Figure 3F:
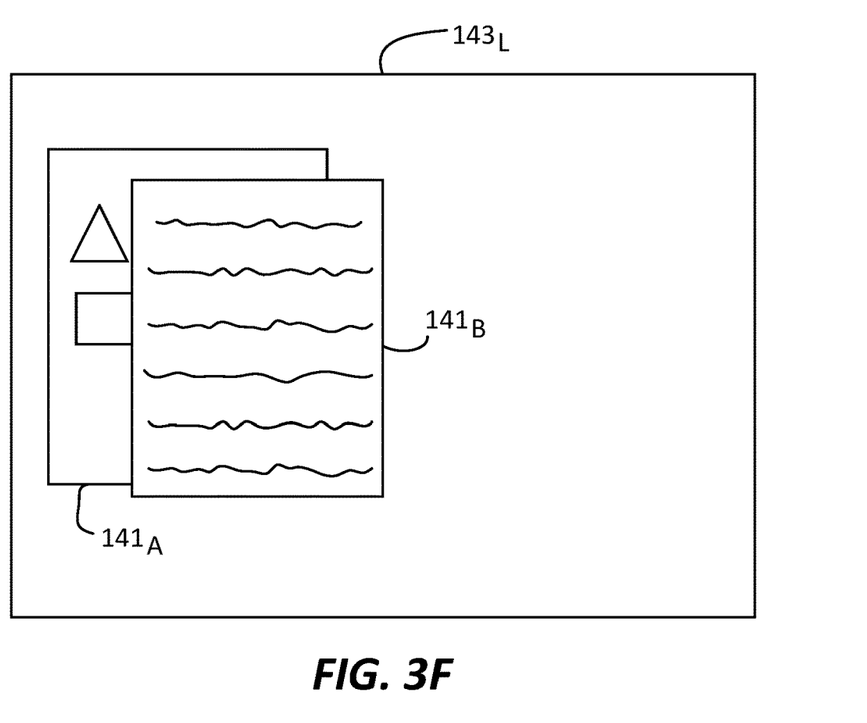
FIG. 3F a displayed local screen of a local information handling system according to one exemplary embodiment of the disclosed systems and methods.

Thus, while local desktop screen 143$_L$ is being shared in block 216, a remote user of each of remote system/s 166 may only view visual image "A" of shareable window 141A (and not visual image "B" of non-shareable window "B"), while a local user of local system 100 may continue to view visual images "A" and "B" of respective windows 141A and 141B on local desktop screen 143$_L$ (and may continue working with all locally executing user applications 107 or other locally-executing logic that is displaying these visual images). In a further embodiment where the entire non-shareable window 141B is not displayed at all (and therefore is invisible) on remote display device/s 165 as shown in FIG. 3D, a local user may be allowed to drag or otherwise position the non-shareable window 141B of local screen 143$_L$ over at least a portion or all of the shareable window 141A of local screen 143$_L$ (as shown in FIG. 3F), while the entire visual image "A" of shareable window 141A of shared desktop screen 143$_S$ remains displayed on remote display device/s 165 and therefore visible to the remote user as shown in FIG. 3D.

It will be understood that although local desktop screen 143$_L$ of the above-described embodiment includes visual images of two windows in the form of a shareable window 141A and a non-shareable window "B", the disclosed systems and methods may be implemented during screen sharing for a local desktop screen 143$_L$ that includes visual images of any number of shareable windows and/or non-shareable windows at any given time, e.g., such as for screen sharing a local desktop screen that includes only a single window that is shareable, for screen sharing a local desktop screen that includes only a single window that is non-shareable, for screen sharing a local desktop screen that includes two or more windows of which two or more windows may be shareable and/or of which two or more windows may be non-shareable, for screen sharing a local desktop screen that includes three or more windows of which one or more windows may be shareable and/or of which one or more windows may be non-shareable, etc. Whatever the case, the OS will dynamically respond in real time (via instruction to OS 101 by window screening API 102) by only transmitting and sharing visual image data corresponding to any currently displayed local system windows that are not designated as non-shareable, while at the same time not transmitting and sharing visual image data of any currently displayed local system windows that have been designated and set as non-shareable.

Returning to the embodiment of FIGS. 2A-2B, methodology 200 may include an optional block 218 during which window screening application 111 may give a local user of local system 100 the option to temporarily request sharing of the visual images of a given non-shareable local window, e.g., such as non-shareable local window 141B of FIG. 3A. If the local user does not make such a request in block 218, then methodology 200 may repeat to blocks 214 and 216, in which case OS 101 continues to only share visual images of shareable local system windows that are not designated as non-shareable (e.g., local system window 141A of local screen $143_L$) with remote system/s $166_1$ to $166_N$, and continues to prevent sharing and display of the visual images corresponding to any local system windows that are designated as non-shareable (e.g., local system window 141B of local system 143).

However, if in block 218 the local user inputs a request to window screening application 111 (e.g., via input using I/O device/s 170) to temporarily allow sharing of the visual images of a given non-shareable local system window (e.g., such as non-shareable local window 141B of FIG. 3A), then methodology 200 proceeds to block 220. In block 220, window screening application 111 may temporarily override non-shareable local system window list 191 and utilize window screening API 102 to interface with and to instruct OS 101 (e.g., via dynamic link library (DLL) injection) that the given local system window (e.g., local system window 141B) is shareable and its visual image data can be shared with remote systems $166_1$ to $166_N$ by window capture API/s 109 that are utilized by screen sharing application/s 107.

Next, in block 222, OS 101 responds to the instruction of block 220 regarding change in non-shareable status of the given local system window (e.g., local system window 141B) that occurs in block 220 (i.e., a change to shareable status) by now sharing and transmitting the visual image data corresponding to the visual image/s of the given local system window (e.g., local system window 141B) of local screen $143_L$ with remote system/s $166_1$ to $166_N$. For example, FIG. 3C shows shared desktop screen 143s with visual image/s of shared local system window 141B now visible to remote user/s on respective remote display device/s 165 of remote information handling system/s $166_1$ to $166_N$ during block 222.

As previously mentioned with regard to block 218, the sharing of the visual image data of the given non-shareable local system window (e.g., local system window 141B) in block 222 may only be temporary, e.g., for a given predefined time period such as 5 minutes or any other selected greater or lesser amount of time. This may be employed, for example, by a local user that would like to temporarily share an individual email window with all remote users of currently-connected remote systems 166, it being understood that remote users of one or more remote systems $166_1$ to $166_N$ one or more may be currently connected to local system 100 at any given time via respective instances of a screen sharing application 107. Thus, window screening application 111 may start a timer in block 220 when it utilizes window screening API 102 to interface with and instruct OS 101 that the given local system window (e.g., local system window 141B) is no longer non-shareable and its visual image data can now be shared with remote systems $166_1$ to $166_N$ by window capture API/s 109 that are utilized by screen sharing application/s 107.

When the elapsed time measured by the timer started in block 220 reaches the predefined time period (e.g., 5 minutes) in block 224, then window screening application 111 may utilize window screening API 102 to interface with and to instruct OS 101 (e.g., via DLL injection) that the given local system window (e.g., local system window 141B) that was shareable in block 220 is now non-shareable again and that its visual image data cannot be shared with remote systems $166_1$ to $166_N$ by window capture APIs 109 that are utilized by screen sharing application/s 107. OS 101 responds to the instruction of block 224 regarding a change back to non-shareable status for the given local system window (e.g., local system window 141B) by not sharing the visual image data of this given local system window of local screen $143_L$ with remote system/s $166_1$ to $166_N$. In the embodiment of FIGS. 3A to 3C, block 224 results in returning the view on remote system display/s 165 to the version of shared desktop screen 143s shown in FIG. 3B (e.g. with the visual image/s of local system window 141B no longer visible). After block 224, subsequent screen shares of local screen $143_L$ with remote systems $166_1$ to $166_N$ will no longer include the visual image data of local system window 141B. Methodology 200 may then repeat to repeat to block 214 and proceed as previously described.

It will also be understood that one or more of the tasks, functions, or methodologies described herein (e.g., including those described herein for components 101, 102, 103, 107, 109, 110, 111, 180, 194, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program includes instructions that are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more blocks of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an processing system or component thereof. The executable instructions may include a plurality of code segments operable to instruct components of an processing system to perform the methodologies disclosed herein.

It will also be understood that one or more blocks of the present methodologies may be employed in one or more code segments of the computer program. For example, a code segment executed by the information handling system may include one or more blocks of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method, comprising:
   displaying a local screen on a local display device of a local information handling system, the displayed local screen comprising visual images of one or more windows that are displayed on the local display device;
   determining whether each of the one or more windows of the displayed local screen is designated as non-shareable; and
   then sharing the local screen from the local information handling system with at least one remote information handling system by transmitting visual image data corresponding to the visual images of at least a portion of the local screen across a network to the at least one remote information handling system without including any of the visual image data corresponding to the visual images of any of the one or more windows that are determined to be designated as non-shareable;
   where the method further comprises:
   providing instructions to an operating system of the local information handling system that the visual image data corresponding to any of the one or more windows that are designated as non-shareable is not to be shared with a window capture application programming interface (API) that is utilized by a screen sharing application executing on the local information handling system,
   executing the screen sharing application to perform the sharing of the local screen from the local information handling system, and
   executing the operating system to respond to the provided instructions by preventing the sharing of the visual image data corresponding to any of the one or more windows that are designated as non-shareable with the window capture application that is utilized by the screen sharing application such that the visual image data corresponding to the visual images of any of the one or more windows that are designated as non-shareable is not transmitted across the network to the at least one remote information handling system.

2. The method of claim 1, where the displayed local screen comprises at least one window that is determined to be designated as non-shareable; and where the method further comprises:
   displaying the visual images from the at least one window that is determined to be designated as non-shareable on the local display device of the local information handling system; and
   where the sharing further comprises sharing the local screen from the local information handling system with the at least one remote information handling system by transmitting the visual image data corresponding to the visual images of the at least a portion of the local screen across the network to the at least one remote information handling system without including any of the visual image data corresponding to the visual images of the at least one window that is determined to be designated as non-shareable.

3. The method of claim 2, further comprising receiving the transmitted visual image data in the at least one remote information handling system; and using the received visual image data to display the visual images of the at least a portion of the local screen on a remote display device of the at least one remote information handling system without the visual images of the at least one window that is determined to be designated as non-shareable.

4. The method of claim 1, where the displayed local screen comprises at least one window that is determined to be designated as non-shareable and at least one window that is determined to not be designated as non-shareable; and where the method further comprises:
   displaying visual images from the at least one window that is determined to be designated as non-shareable on the local display device of the local information handling system simultaneously with displaying visual images from the at least one window that is determined to not be designated as non-shareable on the local display device of the local information handling system; and
   where the sharing further comprises sharing the local screen from the local information handling system with the at least one remote information handling system by transmitting the visual image data corresponding to the visual images of the at least one window that is determined to not be designated as non-shareable to the at least one remote information handling system without including any of the visual image data corresponding to the visual images of the at least one window that is determined to be designated as non-shareable.

5. The method of claim 4, further comprising receiving the transmitted visual image data in the at least one remote information handling system; and using the received visual image data to display the visual images of the at least one window that is determined to not be designated as non-shareable on a remote display device of the at least one remote information handling system without the visual images of the at least one window that is determined to be designated as non-shareable.

6. The method of claim 1, where the displayed local screen comprises at least one window that is determined to be designated as non-shareable; and where the method further comprises:
   displaying visual images from the at least one window that is determined to be designated as non-shareable on the local display device of the local information handling system; and where the sharing further comprises:
first sharing the local screen from the local information handling system with the at least one remote information handling system by transmitting the visual image data corresponding to the visual images of the at least a portion of the local screen across the network to the at least one remote information handling system without including any of the visual image data corresponding to the visual images of the at least one window that is determined to be designated as non-shareable,
then responding to a local user input to the local information handling system by temporarily transmitting the visual image data corresponding to the visual images of the at least one window that is determined to be designated as non-shareable across the network to the at least one remote information handling system for a predefined period of time, and
then, upon expiration of the predefined period of time, returning to transmitting the visual image data corresponding to the visual images of the at least a portion of the local screen across the network to the at least one remote information handling system without including any of the visual image data corresponding to the visual images of the at least one window that is determined to be designated as non-shareable.

7. The method of claim 2, where persistent first information stored on persistent non-volatile memory or storage of the local information handling system designates an identity of a first window of the displayed local screen as non-shareable and/or designates any window containing a displayed predefined word as non-shareable; and where the determining further comprises retrieving the persistent first information from the persistent non-volatile memory or storage of the local information handling system, and then using the retrieved persistent first information to determine that the first window is designated as non-shareable.

8. The method of claim 7, further comprising executing a first application on the local information handling system to generate the visual image data corresponding to the visual images of the first window of the displayed local screen; where the persistent first information designates that all windows generated by the first application are non-shareable; and where the determining further comprises retrieving the persistent first information from the persistent non-volatile memory or storage of the local information handling system, and then using the retrieved persistent first information to determine that the first window is designated as non-shareable.

9. The method of claim 8, further comprising executing a second and different application on the local information handling system to generate the visual image data corresponding to the visual images of a second window of the displayed local screen; where no information is stored on the non-volatile memory or storage of the local information handling system that designates any windows generated by the second application as non-shareable; where the determining further comprises accessing the non-volatile memory or storage of the local information handling system to determine that no information is stored on the non-volatile memory or storage of the local information handling system that designates any windows generated by the second application as non-shareable; and where the method further comprises:
determining that the second window is shareable in response to the determination that no information is stored on the non-volatile memory or storage of the local information handling system that designates any windows generated by the second application as non-shareable; and
then transmitting the visual image data corresponding to the visual images of the second window across the network to the at least one remote information handling system without transmitting any of the visual image data corresponding to the visual images of the first window across the network to the at least one remote information handling system.

10. The method of claim 7, further comprising, while the local information handling system is booting:
retrieving the persistent first information from the persistent non-volatile memory or storage of the local information handling system;
iterating over all currently-executing processes on the local information handling system versus the retrieved persistent first information to determine if any respective windows generated by any of the currently-executing processes is designated as non-shareable; and
then providing the instructions to the operating system of the local information handling system that the visual image data corresponding to any respective windows generated by any of the currently-executing processes that are designated as non-shareable is not to be shared with the window capture API that is utilized by the screen sharing application executing on the local information handling system.

11. The method of claim 7, further comprising maintaining the persistent first information in the persistent non-volatile memory or storage of the local information handling system between multiple different web conference sessions that include the local information handling system; and performing the sharing of the local screen from the local information handling system with the at least one remote information handling system during each of the multiple different web conferences;
iterating over all currently-executing processes on the local information handling system versus the retrieved persistent first information to determine if any respective windows generated by any of the currently-executing processes is designated as non-shareable; and
then providing the instructions to the operating system of the local information handling system that the visual image data corresponding to any respective windows generated by any of the currently-executing processes that are designated as non-shareable is not to be shared with the window capture API that is utilized by the screen sharing application executing on the local information handling system.

12. The method of claim 2, further comprising designating at least one of the one or more windows of the displayed local screen as non-shareable prior to the determining whether each of the one or more windows of the displayed local screen is designated as non-shareable, and prior to the sharing of the local screen from the local information handling system with at least one remote information handling system.

13. The method of claim 1, further comprising:
executing a user application on the local information handling system to generate the visual image data corresponding to the visual images of the one or more windows that are displayed on the local display device by the user application; and injecting information or data into the user application that identifies any of the one or more windows generated by the user application as being designated as non-shareable.

14. The method of claim 1,
where information stored on non-volatile memory or storage of the local information handling system designates any displayed window containing predefined text in the displayed window as non-shareable; and
where the determining whether each of the one or more windows of the displayed local screen is designated as non-shareable comprises:
scanning a text of each of the one or more windows of the displayed local screen in real time as the text of the window is opened for display to determine if it contains the predefined text; and
then, in response to the scanning, designating any of the one or more displayed windows of the displayed local screen having a displayed text that contains the predefined text as non-sharable.

15. The method of claim 14, where the predefined text comprises a predefined keyword; and where the scanning the text of each of the one or more windows comprises scanning a window title bar of each of the one or more windows of the displayed local screen in real time as the text of the window is opened for display to determine if the window title bar of each of the one or more windows contains the predefined keyword.

16. The method of claim 15, where the predefined keyword comprises at least one of "confidential" or "sensitive".

17. The method of claim 1, where information stored on non-volatile memory or storage of the local information handling system designates any displayed window generated by one or more particular predefined websites as non-sharable; and where the determining whether each of the one or more windows of the displayed local screen is designated as non-shareable comprises:
determining an identity of a respective website that generated any of the one or more windows of the displayed local screen; and
then, in response to the determining the identity of the respective website, designating any of the one or more displayed windows of the displayed local screen that is generated by the one or more particular predefined websites as non-sharable.

18. The method of claim 1, where information stored on non-volatile memory or storage of the local information handling system designates any displayed window generated by one or more particular predefined types of user applications as non-sharable; and where the determining whether each of the one or more windows of the displayed local screen is designated as non-shareable comprises:
determining a type of a respective user application that generated any of the one or more windows of the displayed local screen; and
then, in response to the determining the type of the respective user application, designating any of the one or more displayed windows of the displayed local screen that is generated by the one or more predefined types of user applications as non-sharable.

19. The method of claim 18, where the one or more particular predefined types of user applications comprise at least one of all word processing application windows, all spreadsheet application windows, all internet browser application windows, all email application windows, all PDF viewer application windows, all messaging application windows, all computer game windows, or all operating system (OS) notification windows.

20. The method of claim 1, further comprising:
displaying, on the local screen, the visual image of a first non-sharable window over at least a portion of the visual image of a second sharable window; and
transmitting the visual image data corresponding to the second sharable window across the network to the at least one remote information handling system without including any of the visual image data corresponding to the first non-sharable window; and
displaying, on a shared desktop screen of the remote information handling system, an entire visual image of the second sharable window without the visual image of the first non-sharable window.

21. A system, comprising:
a local information handling system comprising at least one programmable integrated circuit, and a local display device coupled to the at least one programmable integrated circuit;
where the at least one programmable integrated circuit of the local information handling system is programmed to:
display a local screen on the local display device of the local information handling system, the displayed local screen comprising visual images of one or more windows that are displayed on the local display device;
determine whether each of the one or more windows of the displayed local screen is designated as a non-shareable window; and
then share the local screen from the local information handling system with at least one remote information handling system by transmitting visual image data corresponding to the visual images of at least a portion of the local screen across a network to the at least one remote information handling system without including any of the visual image data corresponding to the visual images of any of the one or more windows that are determined to be designated as non-shareable;
where the at least one programmable integrated circuit of the local information handling system is programmed to:
provide instructions to an operating system of the local information handling system that the visual image data corresponding to any of the one or more windows that are designated as non-shareable is not to be shared with a window capture application programming interface (API) that is utilized by a screen sharing application executing on the local information handling system;
execute the screen sharing application to perform the sharing of the local screen from the local information handling system, and
execute the operating system to respond to the provided instructions by preventing the sharing of the visual image data corresponding to any of the one or more windows that are designated as non-shareable with the window capture application that is utilized by the screen sharing application such that the visual image data corresponding to the visual images of any of the one or more windows that are designated as non-shareable is not transmitted across the network to the at least one remote information handling system.

22. The system of claim 21, where the displayed local screen comprises at least one window that is determined to be designated as non-shareable; and where the at least one programmable integrated circuit of the local information handling is further programmed to:
  display the visual images from the at least one window that is determined to be designated as non-shareable on the local display device of the local information handling system; and
  share the local screen from the local information handling system with the at least one remote information handling system by transmitting the visual image data corresponding to the visual images of at least a portion of the local screen across the network to the at least one remote information handling system without including any of the visual image data corresponding to the visual images of the at least one window that is determined to be designated as non-shareable.

23. The system of claim 22, further comprising the at least one remote information handling system, the at least one remote information handling system comprising the at least one programmable integrated circuit coupled to a remote display device and programmed to:
  receive the transmitted visual image data from the local information handling system; and
  use the received visual image data to display the visual images of the at least a portion of the local screen on the remote display device of the at least one remote information handling system without the visual images of the at least one window that is determined to be designated as non-shareable.

24. The system of claim 21, where the displayed local screen comprises the at least one window that is determined to be designated as non-shareable and at least one window that is determined to not be designated as non-shareable; and where the at least one programmable integrated circuit of the local information handling system is further programmed to:
  display the visual images from the at least one window that is determined to be designated as non-shareable on the local display device of the local information handling system simultaneously with displaying the visual images from the at least one window that is determined to not be designated as non-shareable on the local display device of the local information handling system; and
  where the sharing further comprises sharing the local screen from the local information handling system with the at least one remote information handling system by transmitting the visual image data corresponding to the visual images of the at least one window that is determined to not be designated as non-shareable to the at least one remote information handling system without including any of the visual image data corresponding to the visual images of the at least one window that is determined to be designated as non-shareable.

25. The system of claim 24, further comprising the at least on programmable integrated circuit programmed to receive the transmitted visual image data in the at least one remote information handling system, and use the received visual image data to display the visual images of the at least one window that is determined to not be designated as non-shareable on a remote display device of the at least one remote information handling system without the visual images of the at least one window that is determined to be designated as non-shareable.

26. The system of claim 21, where the displayed local screen comprises at least one window that is determined to be designated as non-shareable; and where the at least one programmable integrated circuit of the local information handling system is further programmed to:
  display the visual images from the at least one window that is determined to be designated as non-shareable on the local display device of the local information handling system;
  first share the local screen from the local information handling system with the at least one remote information handling system by transmitting the visual image data corresponding to the visual images of the at least a portion of the local screen across the network to the at least one remote information handling system without including any of the visual image data corresponding to the visual images of the at least one window that is determined to be designated as non-shareable window;
  then respond to a local user input to the local information handling system by temporarily transmitting the visual image data corresponding to the visual images of the at least one window that is determined to be designated as non-shareable across the network to the at least one remote information handling system for a predefined period of time; and
  then upon expiration of the predefined period of time return to transmitting the visual image data corresponding to the visual images of the at least a portion of the local screen across the network to the at least one remote information handling system without including any of the visual image data corresponding to the visual images of the at least one window that is determined to be designated as non-shareable.

27. The system of claim 21, where the local information handling system further comprises persistent non-volatile memory or storage coupled to the at least one programmable integrated circuit with persistent first information stored on the persistent non-volatile memory or storage of the local information handling system designating an identity of a first window of the displayed local screen as non-shareable and/or designating any window containing a displayed predefined word as non-shareable; and where the at least one programmable integrated circuit of the local information handling system is further programmed to retrieve the persistent first information from the persistent non-volatile memory or storage of the local information handling system, and then use the retrieved persistent first information to determine that the first window is designated as non-shareable.

28. The system of claim 27, where the persistent first information designates that all windows generated by a first application are non-shareable; and where the at least one programmable integrated circuit of the local information handling system is further programmed to:
  execute the first application to generate the visual image data corresponding to the visual images of the first window of the displayed local screen;
  retrieve the persistent first information from the persistent non-volatile memory or storage of the local information handling system; and
  then use the retrieved persistent first information to determine that the first window is designated as non-shareable.

29. The system of claim 28, where no information is stored on the non-volatile memory or storage of the local information handling system that designates any windows generated by a second application as non-shareable; and where the at least one programmable integrated circuit of the local information handling system is further programmed to:

execute the second application to generate the visual image data corresponding to the visual images of a second window of the displayed local screen;

access the non-volatile memory or storage of the local information handling system to determine that no information is stored on the non-volatile memory or storage of the local information handling system that designates any windows generated by the second application as non-shareable;

determine that the second window is a shareable window in response to the determination that no information is stored on the non-volatile memory or storage of the local information handling system that designates any windows generated by the second application as non-shareable; and then transmit the visual image data corresponding to the visual images of the second window across the network to the at least one remote information handling system without transmitting any of the visual image data corresponding to the visual images of the first window across the network to the at least one remote information handling system.

30. The system of claim 21, where the at least one programmable integrated circuit of the local information handling system is further programmed to receive input from a user of the local information handling system that designates at least one of the one or more windows of the displayed local screen as non-shareable prior to determine whether each of the one or more windows of the displayed local screen is designated as non-shareable, and prior to sharing of the local screen from the local information handling system with at least one remote information handling system.

* * * * *